US006881357B2

(12) United States Patent
Lee et al.

(10) Patent No.: US 6,881,357 B2
(45) Date of Patent: Apr. 19, 2005

(54) TRANSPARENT CONDUCTIVE LAYER AND IMAGE DISPLAY DEVICE EMPLOYING THE SAME

(75) Inventors: Sang-min Lee, Suwon (KR); Ji-won Lee, Suwon (KR); Kang-il Seo, Suwon (KR); Jae-man Choi, Seoul (KR)

(73) Assignee: Samsung SDI Co., Ltd., Suwon (KR)

( * ) Notice: Subject to any disclaimer, the term of this patent is extended or adjusted under 35 U.S.C. 154(b) by 450 days.

(21) Appl. No.: 10/073,045

(22) Filed: Feb. 12, 2002

(65) Prior Publication Data

US 2003/0168644 A1 Sep. 11, 2003

(30) Foreign Application Priority Data

Jan. 23, 2002 (KR) .......................................... 2002-3855

(51) Int. Cl.$^7$ ........................... B32B 9/04; B32B 27/28; H01J 29/88; G02B 1/11; C08G 77/00

(52) U.S. Cl. .................... 252/511; 252/503; 252/518.1; 428/421; 428/422; 428/429; 428/447; 349/137; 313/479; 427/168

(58) Field of Search ................................. 252/503, 511, 252/518.1; 428/423.1, 422, 429, 447, 421; 349/137, 96; 313/479; 427/168

(56) References Cited

U.S. PATENT DOCUMENTS

| | | | | | |
|---|---|---|---|---|---|
| 4,765,729 | A | * | 8/1988 | Taniguchi | 351/163 |
| 5,449,558 | A | * | 9/1995 | Hasegawa et al. | 428/422 |
| 5,858,077 | A | * | 1/1999 | Kayanoki | 106/287.11 |
| 6,136,228 | A | | 10/2000 | Hirai et al. | |
| 6,680,125 | B1 | * | 1/2004 | Sasaki | 428/423.1 |
| 2001/0050741 | A1 | * | 12/2001 | Hokazono et al. | 349/137 |
| 2003/0087102 | A1 | * | 5/2003 | Yamaya et al. | 428/419 |

FOREIGN PATENT DOCUMENTS

| | | | | |
|---|---|---|---|---|
| JP | 10-088068 | * | 4/1998 | C09D/201/02 |
| JP | WO 99/57212 | * | 11/1999 | B32B/27/00 |
| KR | 2000-0050673 | | 8/2000 | |

* cited by examiner

*Primary Examiner*—Yogendra N. Gupta
*Assistant Examiner*—Kallambella Vijayakumar
(74) *Attorney, Agent, or Firm*—Leydig, Voit & Mayer, Ltd.

(57) ABSTRACT

Provided a transparent conductive layer and an image display device employing the transparent conductive layer. The transparent conductive layer includes a conductive layer containing a metal oxide and a protective layer formed on the conductive layer. The protective layer contains a hydrolyzed and polycondensated product of silicon alkoxide and at least one of mercapto compound and its hydrolyzed and polycondensated product.

7 Claims, 3 Drawing Sheets

TRANSPARENT CONDUCTIVE LAYER AND IMAGE DISPLAY DEVICE EMPLOYING THE SAME

BACKGROUND OF THE INVENTION

1. Field of the Invention

The present invention relates to a transparent conductive layer and an image display device employing the same, and more particularly, to a transparent conductive layer which reduces reflection, shields electromagnetic waves, protects against physical damage, and which is moisture proof and water repellent, and an image display device employing the transparent conductive layer.

2. Description of the Related Art

Transparent conductive layers refer to thin conductive films coated on high-transmittance insulation surfaces. Transparent conductive layers are widely used as anti-static layers and electromagnetic wave shielding layers for home appliances or as transparent electrodes for power supply in flat liquid crystal displays or electroluminescent devices. In recent years an increasing concern about the harmfulness of electromagnetic waves to the human body, which come out of the monitor of image display devices including cathode ray tubes, has increased the need for a multi-functional transparent conductive film having both anti-reflective and anti-static functions.

To shield the electromagnetic waves emitted from the monitor of a display device such as a cathode ray tube (CRT), a conductive layer is formed on a panel surface of the display device. A conductive layer for both electromagnetic wave shielding and anti-static functions should have a low surface resistance of $10^2$–$10^4$ Σ/~.

When a coating composition containing a conductive oxide, such as antimony (Sb)-doped tin oxide or tin (Sn)-doped indium oxide, is used to form a low surface resistance conductive layer, the conductive layer should be thicker than a conventional coated layer to obtain a desired anti-static effect. Therefore, it was unpractical to form a thin electromagnetic wave shielding and anti-static coated layer using a conductive oxide such as Sb-doped tin oxide or Sn-doped indium oxide.

Another approach to form a low surface resistance conductive layer involves use of a conductive layer coating composition containing minute metal particles such as silver (Ag) to form a thin conductive layer. Also, the conductive layer coating composition includes an organic stabilizer, such as polyvinyl alcohol, polyvinyl pyrrolidone, and gelatin, to improve the dispersion of the metal particles in the coating composition.

However, the thin conductive layer formed of the coating composition containing the metal particles has a high grain boundary resistance due to interaction between the particles stabilized by the organic stabilizer, so the surface resistance of the thin conductive layer cannot be lowered. Therefore, there is a need to destroy and remove the organic stabilizer by heating the conductive layer at a high temperature of about 400° C. after being coated.

However, the high-temperature heating performed to destroy and remove the organic stabilizer causes the metal particles to dissolve and aggregate and thereby reduces the transparency of the resulting thin conductive layer. In a transparent conductive layer containing metal particles, especially silver, the metal particles are grown by ionization and the metal is susceptible to oxidize and corrode, thereby lowering the reliability of a display device in terms of thin film conductivity and light transmittance.

To address these problems, Korean Laid-open Patent Publication No. 98-25037 suggested a transparent conductive layer, which comprises a transparent conductive particle layer formed on a substrate and containing composite metal particles, for example, of at least two metals selected from Au, Ag, Rd, Pt, Rh, Ru, Cu, Fe, Ni, Co, Sn, Ti, In, Al, Ta, and Sb, having an average particle size of 1–200 nm, and a transparent coated layer formed on the transparent conductive particle layer with a smaller refractive index than the transparent conductive particle layer.

However, such a transparent conductive particle layer causes many practical problems because the metal particles in the transparent conductive particle layer are oxidized by water vapor and oxygen present in the air. Also, the use of the costly metal particles increases the cost of manufacturing the transparent conductive layer.

A method of forming a transparent conductive layer on the surface of a cathode ray tube as an image display device involves forming a conductive layer by coating a glass panel with a conductive composition, which includes a conductive metal and a solvent, forming a protective layer by coating a silicon alkoxide-containing composition on the conductive layer, and forming a spray-coated layer on the protective layer. However, the transparent conductive layer formed using this method absorbs external moisture and thereby causes spots or stains on the surface. These surface spots or stains often occur during the manufacture and use as well as long-term transportation and storage and are hardly removed, thereby lowering product quality. In addition, the absorption of moisture markedly weakens the intensity of the transparent conductive layer, so that it is easily delaminated and separated.

To solve these problems, the present invention suggests use of a water repellent in the formation of the spray-coated layer to form a conductive layer whose surface is water repellent and wet-endurable with the effect of reducing reflectivity and uses fluoroalkylsilane having a small surface tension as the water repellent (Korean Laid-open Patent Publication No. 2000-50673). Although the water-repellent spray-coated layer shows excellent film hardness and water repellency, the moisture resistance is easily decreased and variations in resistance increase as the composition and thickness of the conductive layer change.

SUMMARY OF THE INVENTION

To solve the above-described problems, it is a first object of the present invention to provide a protective layer composition which provides a conductive layer with excellent anti-reflection and electromagnetic wave shielding characteristics at low cost.

A second object of the present invention is to provide a spray-coated layer composition capable of maintaining water repellency and moisture resistance with a small variation in resistance over time as a result of variations in thickness and composition of a conductive layer formed below the spray-coated layer.

A third object of the present invention is to provide a transparent conductive layer, which includes a protective layer formed of the protective layer composition so that water repellency and moisture resistance are maintained with a small change in resistance over time as a result of variations in thickness and composition of the conductive layer.

A fourth object of the present invention is to provide a transparent conductive layer, which includes a spray-coated layer formed of the spray-coated layer composition so that water repellency and moisture resistance are maintained with a small change in resistance over time as a result of variations in thickness and composition of the conductive layer.

A fifth object of the present invention is to provide environmentally compatible image display apparatuses capable of effective shielding electromagnetic waves and electromagnetic fields.

The first object of the present invention is achieved by a protective layer composition comprising a metal compound of formula (1) below, a mercapto compound of formula (3) or (4) below, and a polar solvent:

(1)

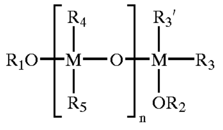

where M is selected from the group consisting of Si, Ti, Sn, and Zr;

$R_1$ is a $C_1$–$C_{20}$ alkyl group or -M($R_{14}R_{15}R_{16}$) where $R_{14}$, $R_{15}$, and $R_{16}$ are, independently, a $C_1$–$C_{20}$ alkyl group, a $C_1$–$C_{20}$ alkoxy group, or a $C_6$–$C_{20}$ aryl group;

$R_2$ is a $C_1$–$C_{20}$ alkyl group;

at least one of $R_3$ and $R_3'$ is a $C_1$–$C_{20}$ alkoxy group, and the remaining group is a $C_1$–$C_{20}$ alkyl group, a $C_1$–$C_{20}$ alkoxy group, a $C_2$–$C_{20}$ alkylene group, or a $C_6$–$C_{20}$ aryl group;

at least one of $R_4$ and $R_5$ is a $C_1$–$C_{20}$ alkoxy group, and the remaining group is a $C_1$–$C_{20}$ alkyl group, a $C_2$–$C_{20}$ alkylene group, or a $C_6$–$C_{20}$ aryl group; and n is an integer from 0 to 20, $R_9SH$ (3)

where $R_9$ is a $C_1$–$C_{20}$ alkyl group, a $C_1$–$C_{20}$ alkyl group with a hydroxy group, a $C_1$–$C_{20}$ hydroxyalkyl group with a hydroxy substituent, or —$(CH_2)_k$COOH, where k is an integer from 1 to 10, and (4)

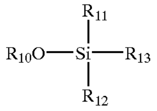

where $R_{10}$ is a $C_1$–$C_{20}$ alkyl group; $R_{11}$ and $R_{12}$ are, independently, a $C_1$–$C_{20}$ alkyl group, a $C_1$–$C_{20}$ alkoxy group, or a $C_1$–$C_{20}$ alkyl group with a mercapto group; and $R_{13}$ is a $C_1$–$C_{20}$ alkyl group with a mercapto (—SH) group.

In the protective layer composition, preferably, the mercapto compound of formula (3) or (4) above is at least one selected from the group consisting of 3-mercaptopropyltrimethoxysilane, 3-mercaptopropylmethyldimethoxysilane, 3-mercapto-1,2-propanediol, 1-mecapto-2-propanol, 3-mercaptopropionic acid, di-(3-mercaptopropyl)dimethoxysilane, and tris-(3-mercaptopropyl)methoxysilane. The mercapto compound may be contained in an amount of 1–15 parts by weight based on 100 parts by weight of the metal compound of formula (1) above.

The metal compound of formula (1) above may be at least one selected from the group consisting of tetraethylorthosilicate, tetramethylorthosilicate, methyltrimethoxyorthosilicate, vinyltriethoxysilane, 3-glycidoxypropyltrimethoxysilane, and phenyltriethoxysilane.

It is preferable that the protective layer composition further comprises a metal compound of formula (5) below:

(5)

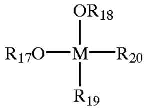

where M is selected from the group consisting of Si, Ti, Sn, and Zr; $R_{17}$ and $R_{18}$ are, independently, a $C_1$–$C_{20}$ alkyl group or a $C_6$–$C_{20}$ aryl group; and $R_{19}$ and $R_{20}$ are, independently, a $C_1$–$C_{20}$ alkyl group, a $C_2$–$C_{20}$ alkylene group, or a $C_6$–$C_{20}$ aryl group. Suitable examples of the metal compound of formula (5) above for the protective layer composition include at least one selected from the group consisting of dimethyldimethoxyorthosilicate, diethyldimethoxyorthosilicate, dimethyldiethoxyorthosilicate, and diethyldiethoxyorthosilicate.

Preferably, the polar solvent is at least one selected from the group consisting of ethanol, methanol, butanol, isopropanol, methylethylketone, methylcellosolve, and ethylcellosolve. Preferably, the polar solvent is contained in an amount of 1000–4000 parts by weight based on 100 parts by weight of the metal compound of formula (1) above.

It is preferable that the protective layer composition further comprises a hydrolytic catalyst in an amount of 0.1–0.9 mole with respect to 1 mole of the metal compound of formula (1) above. In this case, the hydrolytic catalyst may be at least one selected from the group consisting of nitric acid, hydrochloric acid, phosphoric acid, and sulfuric acid.

The second object of the present invention is achieved by a spray-coated layer composition comprising a metal compound of formula (1) below, fluoroalkylsilane of formula (2) below, a mercapto compound of formula (3) or (4) below, and a polar solvent:

(1)

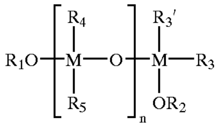

where M is selected from the group consisting of Si, Ti, Sn, and Zr;

$R_1$ is a $C_1$–$C_{20}$ alkyl group or -M($R_{14}R_{15}R_{16}$) where $R_{14}$, $R_{15}$, and $R_{16}$ are, independently, a $C_1$–$C_{20}$ alkyl group, a $C_1$–$C_{20}$ alkoxy group, or a $C_6$–$C_{20}$ aryl group;

$R_2$ is a $C_1$–$C_{20}$ alkyl group;

at least one of $R_3$ and $R_3'$ is a $C_1$–$C_{20}$ alkoxy group, and the remaining group is a $C_1$–$C_{20}$ alkyl group, a $C_1$–$C_{20}$ alkoxy group, a $C_2$–$C_{20}$ alkylene group, or a $C_6$–$C_{20}$ aryl group;

at least one of $R_4$ and $R_5$ is a $C_1$–$C_{20}$ alkoxy group, and the remaining group is a $C_1$–$C_{20}$ alkyl group, a $C_2$–$C_{20}$ alkylene group, or a $C_6$–$C_{20}$ aryl group; and n is an integer from 0 to 20, (2)

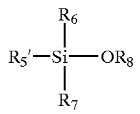

where $R_5'$ is a fluorinated $C_1$–$C_{20}$ alkyl group; $R_6$ and $R_7$ are, independently, a $C_1$–$C_{20}$ alkoxy group or a fluorinated $C_1$–$C_{20}$ alkyl group; and $R_8$ is a $C_1$–$C_{20}$ alkyl group, $R_9SH$ (3)

where $R_9$ is a $C_1$–$C_{20}$ alkyl group, a $C_1$–$C_{20}$ alkyl group with a hydroxy group, a $C_1$–$C_{20}$ hydroxyalkyl group with a hydroxy substituent, or $-(CH_2)_kCOOH$, where k is an integer from 1 to 10, and (4)

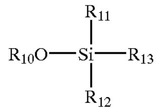

where $R_{10}$ is a $C_1$–$C_{20}$ alkyl group; $R_{11}$ and $R_{12}$ are, independently, a $C_1$–$C_{20}$ alkyl group, a $C_1$–$C_{20}$ alkoxy group, or a $C_1$–$C_{20}$ alkyl group with a mercapto group; and $R_{13}$ is a $C_1$–$C_{20}$ alkyl group with a mercapto (—SH) group.

In the spray-coated layer composition, the fluoroalkylsilane of formula (2) above may be at least one selected from the group consisting of heptadecafluorodecyltriethoxysilane, pentadecafluorohexyltrimethoxysilane, heptadecafluorodecyltrimethoxysilane, heptadecafluorodecyltriisopropoxysilane, heptadecafluorodecyltributoxysilane, di-(heptadecafluorodecyl)diethoxysilane, and tris-(heptadecafluorodecyl)ethoxysilane. The fluoroalkylsilane of formula (2) above may be contained in an amount of 1–15 parts by weight based on 100 parts by weight of the metal compound of formula (1) above.

Suitable examples of the mercapto compound of formula (3) or (4) above for the spray-coated layer composition are the same as those for the protective layer composition. Preferably, in the spray-coated layer composition, the mercapto compound is contained in an amount of 1–15 parts by weight based on 100 parts by weight of the metal compound of formula (1) above.

Suitable examples of the metal compound of formula (1) above include at least one selected from the group consisting of tetraethylorthosilicate, tetramethylorthosilicate, methyltrimethoxyorthosilicate, vinyltriethoxysilane, 3-glycidoxypropyltrimethoxysilane, and phenyltriethoxysilane.

It is preferable that the spray-coated layer composition further comprises a metal compound of formula (5) below:

(5)

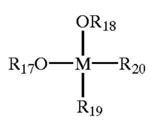

where M is selected from the group consisting of Si, Ti, Sn, and Zr; $R_{17}$ and $R_{18}$ are, independently, a $C_1$–$C_{20}$ alkyl group or a $C_6$–$C_{20}$ aryl group; and $R_{19}$ and $R_{20}$ are, independently, a $C_1$–$C_{20}$ alkyl group, a $C_2$–$C_{20}$ alkylene group, or a $C_6$–$C_{20}$ aryl group. Suitable examples of the metal compound of formula (5) above for the spray-coated layer composition may include at least one selected from the group consisting of dimethyldimethoxyorthosilicate, diethyldimethoxyorthosilicate, dimethyldiethoxyorthosilicate, and diethyldiethoxyorthosilicate.

In the spray-coated layer composition, the polar solvent may be at least one selected from the group consisting of ethanol, methanol, butanol, isopropanol, methylethylketone, methylcellosolve, and ethylcellosolve. Preferably, the polar solvent is contained in an amount of 1000–4000 parts by weight based on 100 parts by weight of the metal compound of said formula (1).

Like the protective layer composition, the spray-coated layer composition may further comprise a hydrolytic catalyst. In this case, the amount of the hydrolytic catalyst used and suitable examples thereof are the same as those for the protective layer composition.

The third object of the present invention is achieved by a transparent conductive layer comprising a conductive layer containing a metal oxide and a protective layer formed on the conductive layer, the protective layer containing a hydrolyzed and polycondensated product of a metal compound of formula (1) below and at least one of a mercapto compound of formula (3) or (4) below and its hydrolyzed and polycondensated product:

(1)

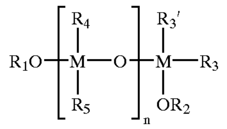

where M is selected from the group consisting of Si, Ti, Sn, and Zr;

$R_1$ is a $C_1$–$C_{20}$ alkyl group or $-M(R_{14}R_{15}R_{16})$ where $R_{14}$, $R_{15}$, and $R_{16}$ are, independently, a $C_1$–$C_{20}$ alkyl group, a $C_1$–$C_{20}$ alkoxy group, or a $C_6$–$C_{20}$ aryl group;

$R_2$ is a $C_1$–$C_{20}$ alkyl group;

at least one of $R_3$ and $R_3'$ is a $C_1$–$C_{20}$ alkoxy group, and the remaining group is a $C_1$–$C_{20}$ alkyl group, a $C_1$–$C_{20}$ alkoxy group, a $C_2$–$C_{20}$ alkylene group, or a $C_6$–$C_{20}$ aryl group;

at least one of $R_4$ and $R_5$ is a $C_1$–$C_{20}$ alkoxy group, and the remaining group is a $C_1$–$C_{20}$ alkyl group, a $C_2$–$C_{20}$ alkylene group, or a $C_6$–$C_{20}$ aryl group; and n is an integer from 0 to 20, $R_9SH$ (3)

where $R_9$ is a $C_1$–$C_{20}$ alkyl group, a $C_1$–$C_{20}$ alkyl group with a hydroxy group, a $C_1$–$C_{20}$ hydroxyalkyl group with a hydroxy substituent, or $-(CH_2)_kCOOH$, where k is an integer from 1 to 10, and (4)

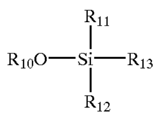

where $R_{10}$ is a $C_1$–$C_{20}$ alkyl group; $R_{11}$ and $R_{12}$ are, independently, a $C_1$–$C_{20}$ alkyl group, a $C_1$–$C_{20}$ alkoxy group, or a $C_1$–$C_{20}$ alkyl group with a mercapto group; and $R_{13}$ is a $C_1$–$C_{20}$ alkyl group with a mercapto (—SH) group.

It is preferable that the protective layer further contains a hydrolyzed and polycondensated product of a metal compound of formula (5) below:

(5)

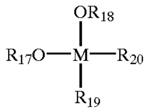

where M is selected from the group consisting of Si, Ti, Sn, and Zr; $R_{17}$ and $R_{18}$ are, independently, a $C_1$–$C_{20}$ alkyl group or a $C_6$–$C_{20}$ aryl group; and $R_{19}$ and $R_{20}$ are, independently, a $C_1$–$C_{20}$ alkyl group, a $C_2$–$C_{20}$ alkylene group, or a $C_6$–$C_{20}$ aryl group. Suitable examples of the metal compound of formula (5) above for the protective layer are the same as described above.

It is preferable that the transparent conductive layer further comprises, on the protective layer, a spray-coated layer containing a hydrolyzed and polycondensated product of the metal compound of formula (1) above, at least one of fluoroalkylsilane of formula (2) below and its hydrolyzed and polycondensated product, and at least one of a mercapto compound of formula (3) or (4) above and its hydrolyzed and polycondensated product:

(2)

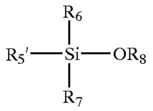

where $R_5$' is a fluorinated $C_1$–$C_{20}$ alkyl group; $R_6$ and $R_7$ are, independently, a $C_1$–$C_{20}$ alkoxy group or a fluorinated $C_1$–$C_{20}$ alkyl group; and $R_8$ is a $C_1$–$C_{20}$ alkyl group.

Preferably, the spray-coated layer is formed as a non-continuous layer.

It is preferable that the spray-coated layer further contains a hydrolyzed and polycondensated product of a metal compound of formula (5) below:

(5)

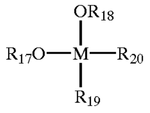

where M is selected from the group consisting of Si, Ti, Sn, and Zr; $R_{17}$ and $R_{18}$ are, independently, a $C_1$–$C_{20}$ alkyl group or a $C_6$–$C_{20}$ aryl group; and $R_{19}$ and $R_{20}$ are, independently, a $C_1$–$C_{20}$ alkyl group, a $C_2$–$C_{20}$ alkylene group, or a $C_6$–$C_{20}$ aryl group.

The fourth object of the present invention is achieved by a transparent conductive layer comprising a conductive layer containing a metal oxide and a protective layer and spray-coated layer sequentially formed to protect the conductive layer, the spray-coated layer containing a hydrolyzed and polycondensated product of a metal compound of formula (1) below, at least one of fluoroalkylsilane of formula (2) below and its hydrolyzed and polycondensated product, and at least one of a mercapto compound of formula (3) or (4) below and its hydrolyzed and polycondensated product, and the protective layer containing a hydrolyzed and polycondensated product of the metal compound of formula (1) below:

(1)

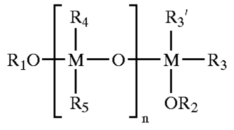

where M is selected from the group consisting of Si, Ti, Sn, and Zr;

$R_1$ is a $C_1$–$C_{20}$ alkyl group or -$M(R_{14}R_{15}R_{16})$ where $R_{14}$, $R_{15}$, and $R_{16}$ are, independently, a $C_1$–$C_{20}$ alkyl group, a $C_1$–$C_{20}$ alkoxy group, or a $C_6$–$C_{20}$ aryl group;

$R_2$ is a $C_1$–$C_{20}$ alkyl group;

at least one of $R_3$ and $R_3$' is a $C_1$–$C_{20}$ alkoxy group, and the remaining group is a $C_1$–$C_{20}$ alkyl group, a $C_1$–$C_{20}$ alkoxy group, a $C_2$–$C_{20}$ alkylene group, or a $C_6$–$C_{20}$ aryl group;

at least one of $R_4$ and $R_5$ is a $C_1$–$C_{20}$ alkoxy group, and the remaining group is a $C_1$–$C_{20}$ alkyl group, a $C_2$–$C_{20}$ alkylene group, or a $C_6$–$C_{20}$ aryl group; and n is an integer from 0 to 20, (2)

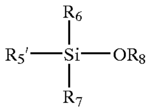

where $R_5$' is a fluorinated $C_1$–$C_{20}$ alkyl group; $R_6$ and $R_7$ are, independently, a $C_1$–$C_{20}$ alkoxy group or a fluorinated $C_1$–$C_{20}$ alkyl group; and $R_8$ is a $C_1$–$C_{20}$ alkyl group, $R_9SH$ (3)

where $R_9$ is a $C_1$–$C_{20}$ alkyl group, a $C_1$–$C_{20}$ alkyl group with a hydroxy group, a $C_1$–$C_{20}$ hydroxyalkyl group with a hydroxy substituent, or $—(CH_2)_k COOH$, where k is an integer from 1 to 10, and (4)

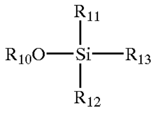

where $R_{10}$ is a $C_1$–$C_{20}$ alkyl group; $R_{11}$ and $R_{12}$ are, independently, a $C_1$–$C_{20}$ alkyl group, a $C_1$–$C_{20}$ alkoxy group, or a $C_1$–$C_{20}$ alkyl group with a mercapto group; and $R_{13}$ is a $C_1$–$C_{20}$ alkyl group with a mercapto (—SH) group.

It is preferable that the spray-coated layer is formed as a non-continuous layer.

Suitable examples and the amounts of fluoroalkylsilane of formula (2) above, the mercapto compound of formula (3) or (4) above, and the metal compound of formula (1) above are the same as described above.

It is preferable that the spray-coated layer further contains a hydrolyzed and polycondensated product of a metal compound of formula (5) below:

(5)

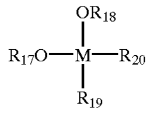

where M is selected from the group consisting of Si, Ti, Sn, and Zr; $R_{17}$ and $R_{18}$ are, independently, a $C_1$–$C_{20}$ alkyl group or a $C_6$–$C_{20}$ aryl group; and $R_{19}$ and $R_{20}$ are, independently, a $C_1$–$C_{20}$ alkyl group, a $C_2$–$C_{20}$ alkylene group, or a $C_6$–$C_{20}$ aryl group. Suitable examples of the metal compound of formula (5) above are the same as described above.

The fifth object of the present invention is achieved by image display apparatuses employing the transparent conductive layers described above. In a preferred embodiment, the image display apparatus is a cathode ray tube.

BRIEF DESCRIPTION OF THE DRAWINGS

The above objects and advantages of the present invention will become more apparent by describing in detail preferred embodiments thereof with reference to the attached drawings in which.

DETAILED DESCRIPTION OF THE INVENTION

Figure 1A:
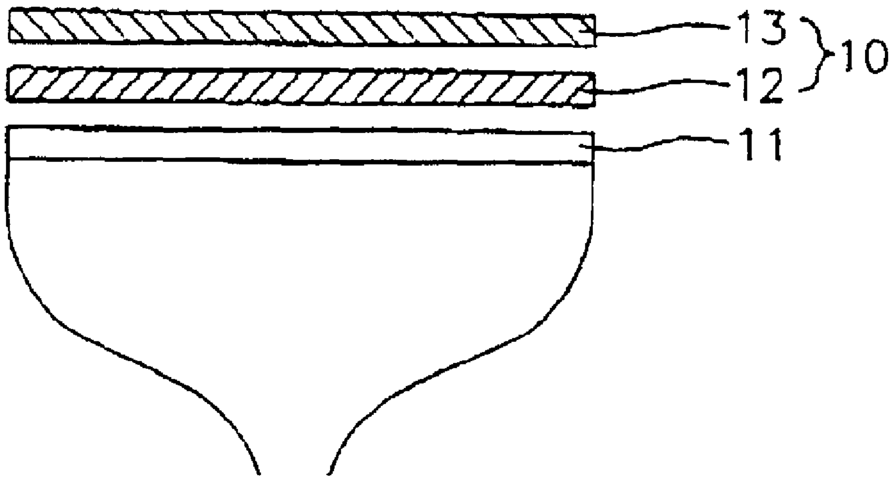
FIGS. 1A and 1B are sectional views showing stacked structures of transparent conductive layers formed on cathode ray tube (CRT) panels according to the present invention.

A first transparent conductive layer according to the present invention, which can be manufactured at low cost with low-reflectivity and excellent electromagnetic wave shielding effect, compared to the prior art, is characterized by comprising a conductive layer of a high reflective index, which is formed of a relatively cheap metal oxide such as tin-doped indium oxide (ITO), and a protective layer of a low reflective index formed on the conductive layer.

The low-refractive-index protective layer is formed of a protective layer composition including a mercapto compound of formula (3) or (4) below, a metal compound of formula (1) below, such as silicon alkoxide, and a polar solvent to dissolve or disperse these compounds. The mercapto compound of formula (3) or (4) below is a compound capable of reacting with the metal oxide to thereby prevent oxidation and enhance reducibility of the metal oxide during a thermal process performed to form the transparent conductive layer. It is preferable that the mercapto compound has formula (4) below. This is because the mercapto compound of formula (4) below thermally reacts with silicon alkoxide to form a network structure and thus enhance hardness of the transparent conductive layer.

(1)

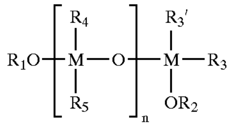

In formula (1) above, M is selected from the group consisting of Si, Ti, Sn, and Zr; $R_1$ is a $C_1$–$C_{20}$ alkyl group or -$M(R_{14}R_{15}R_{16})$ where $R_{14}$, $R_{15}$, and $R_{16}$ are, independently, a $C_1$–$C_{20}$ alkyl group, a $C_1$–$C_{20}$ alkoxy group, or a $C_6$–$C_{20}$ aryl group; $R_2$ is a $C_1$–$C_{20}$ alkyl group; at least one of $R_3$ and $R_3$' is a $C_1$–$C_{20}$ alkoxy group, and the remaining group is a $C_1$–$C_{20}$ alkyl group, a $C_1$–$C_{20}$ alkoxy group, a $C_2$–$C_{20}$ alkylene group, or a $C_6$–$C_{20}$ aryl group; at least one of $R_4$ and $R_5$ is a $C_1$–$C_{20}$ alkoxy group, and the remaining group is a $C_1$–$C_{20}$ alkyl group, a $C_2$–$C_{20}$ alkylene group, or a $C_6$–$C_{20}$ aryl group; and n is an integer from 0 to 20, $R_9SH$ (3)

In formula (3) above, $R_9$ is a $C_1$–$C_{20}$ alkyl group, a $C_1$–$C_{20}$ alkyl group with a hydroxy group, a $C_1$–$C_{20}$ hydroxyalkyl group with a hydroxy substituent, or —$(CH_2)_k COOH$, where k is an integer from 1 to 10, and (4)

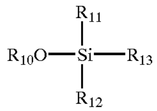

In formula (4) above, $R_{10}$ is a $C_1$–$C_{20}$ alkyl group; $R_{11}$ and $R_{12}$ are, independently, a $C_1$–$C_{20}$ alkyl group, a $C_1$–$C_{20}$ alkoxy group, or a $C_1$–$C_{20}$ alkyl group with a mercapto group; and $R_{13}$ is a $C_1$–$C_{20}$ alkyl group with a mercapto (—SH) group.

For the groups $R_1$, $R_2$, $R_3$, $R_3N$, $R_4$, $R_5$, $R_{14}$, $R_{15}$, and $R_{16}$ in formula (1) above, suitable examples of the $C_1$–$C_{20}$ alkyl group include a methyl group, an ethyl group, a butyl group, a propyl group, a isopropyl group and the like, and suitable examples of the $C_1$–$C_{20}$ alkoxy group include a methoxy group, an ethoxy group, a propoxy group, an isopropoxy group, a butoxy group and the like. A suitable example of the $C_2$–$C_{20}$ alkylene group includes a vinyl group, and a suitable example of the $C_6$–$C_{20}$ aryl group includes a phenyl group.

In formula (3) above, suitable examples of the $C_1$–$C_{20}$ alkyl group include a methyl group, an ethyl group, a butyl group, and a propyl group, suitable examples of the $C_1$–$C_{20}$ alkyl group with a hydroxy group include —$CH_2CH(OH)CH_2CH_3$, —$CH_2CH_2CH_2CH_2OH$ and the like, and a suitable example of the $C_1$–$C_{20}$ hydroxyalkyl group with a hydroxy substituent includes —$CH_2CH(OH)CH_2OH$. Also, suitable examples of the group —$(CH_2)_k COOH$, where k is an integer from 1 to 10, include —$CH_2CH_2COOH$ and —$CH_2CH_2CH_2COOH$.

For the groups $R_{10}$, $R_{11}$, $R_{12}$, and $R_{13}$ in formula (4) above, suitable examples of the $C_1$–$C_{20}$ alkyl group include a methyl group, an ethyl group, a propyl group, and a butyl group, and suitable examples of the $C_1$–$C_{20}$ alkoxy group include a methoxy group, an ethoxy group, a propoxy group, a isopropoxy group, a butoxy group and the like. Suitable examples of the $C_1$–$C_{20}$ alkyl group with a mercapto group include a 3-mercaptopropyl group, a 4-mercaptobutyl group and the like.

As described above, in formula (1) above of the metal compound, it is preferable that at least one of the groups $R_4$ and $R_5$ is a $C_1$–$C_{20}$ alkoxy group and at least one of the groups $R_3$ and $R_3'$ is a $C_1$–$C_{20}$ alkoxy group. Such a metal compound with these groups can form a 3-dimensional network structure of metal oxide, such as silica, through hydrolysis and polycondensation.

In formula (1) above of the metal compound, if n is non-zero, and n is preferably an integer from 3 to 5.

According to the present invention, suitable examples of the metal compound of formula (1) above include tetraethylorthosilicate, tetramethylorthosilicate, tetraisopropylorthosilicate, methyltrimethoxyorthosilicate, vinyltriethoxysilane, phenyltriethoxysilane, 3-glycidoxypropyltrimethoxysilane and the like.

In an embodiment of the present invention, the metal compound of formula (1) above may be a mixture of a first silane compound, which is at least one selected from the group consisting of tetraethylorthosilicate, tetramethylorthosilicate, tetraisopropylorthosilicate, methyltrimethoxyorthosilicate, and 3-glycidoxypropyltrimethoxysilane, and a second silane compound, which is at least one selected from the group consisting of vinyltriethoxysilane and phenyltriethoxysilane. In this case, the second silane compound may be added in an amount of 0.1–5 parts by with respect to 100 parts by weight of the first silane compound.

In an alternative embodiment of the present invention, the metal compound of formula (1) above may be used along with a metal compound of formula (5) below:

(5)

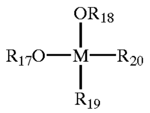

where M is selected from the group consisting of Si, Ti, Sn, and Zr; $R_{17}$ and $R_{18}$ are, independently, a $C_1$–$C_{20}$ alkyl group or a $C_6$–$C_{20}$ aryl group; and $R_{19}$ and $R_{20}$ are, independently, a $C_1$–$C_{20}$ alkyl group, a $C_2$–$C_{20}$ alkylene group, or a $C_6$–$C_{20}$ aryl group.

In other words, the metal compound of formula (1) above may be a mixture of a first silane compound, which is at least one selected from the group consisting of tetraethylorthosilicate, tetramethylorthosilicate, tetraisopropylorthosilicate, methyltrimethoxyorthosilicate, 3-glycidoxypropyltrimethoxysilane, vinyltriethoxysilane, and phenyltriethoxysilane, and the metal compound of formula (5) above as a second silane compound, which is at least one selected from the group consisting of dimethyldimethoxyorthosilicate, diethyldiethoxyorthosilicate, dimethyldiethoxyorthosilicate, and diethyldimethoxyorthosilicate. This composition of the metal compound advantageously enhances the water repellency. In this case, in terms of enhanced water repellency property of the productive layer, it is preferable that the second silane compound is added in an amount of 0.1–5 parts by weight with respect to 100 parts by weight of the first silane compound.

Suitable examples of the mercapto compound having formula (3) above include organic alcohols such as 3-mercapto-1,2-propanediol, 1-mecapto-2-propanol and the like, and organic acids such as 3-mercaptopropionic acid. Suitable examples of the mercapto compound having formula (4) above include 3-mercaptopropyltrimethoxysilane, 3-mercaptopropylmethyldimethoxysilane, di-(3-mercaptopropyl)dimethoxysilane, tris-(3-mercaptopropyl)methoxysilane and the like.

As an example, the principle of the present invention will be described with reference to the mercapto compound of formula (3) above.

A common method to enhance the conductivity of a metal oxide such as ITO involves a thermal process in a reducing gas atmosphere, such as hydrogen gas. This method results in ITO with excellent resistance characteristics. However, the thermal process performed under hydrogen gas atmosphere is costly, so large-scale production is difficult.

Another method to increase the conductivity of metal oxide uses a reducing solvent such as dimethylformamide. This method also can improve resistance characteristics, but a resistance value is varied even if there is only one day left, thereby deteriorating the resistance stability.

According to the present invention, a protective layer composition formulated by adding the mercapto compound of formula (3) above to silicon alkoxide as a metal compound having formula (1) above and a polar solvent is used to coat a top surface of a transparent conductive layer formed of a metal oxide. By covering the metal oxide layer with the mercapto compound having a reducibility to prevent contact with water vapor or oxygen present in the air, oxidation of the metal oxide layer is suppressed. The result is a transparent conductive layer with low-resistance and electromagnetic wave shielding characteristics.

Also, the first transparent conductive layer according to the present invention may further include a spray-coated layer formed on the high-refractive-index protective layer. The spray coated has an uneven surface configuration to scatter an incident external light and thereby to prevent light reflection. A spray-coated layer composition including a metal compound of formula (1) above, fluoroalkylsilane of formula (2) below, a mercapto compound of formula (3) or (4) above, and a polar solvent is used to form the spray-coated layer. Preferably, the spray-coated layer is formed as a non-continuous layer.

(2)

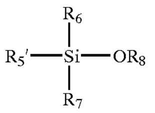

In formula (2) above, $R_5'$ is a fluorinated $C_1$–$C_{20}$ alkyl group; $R_6$ and $R_7$ are, independently, a $C_1$–$C_{20}$ alkoxy group or a fluorinated $C_1$–$C_{20}$ alkyl group; and $R_8$ is a $C_1$–$C_{20}$ alkyl group.

For the groups $R_5'$, $R_6$, $R_7$, and $R_8$ in formula (2) above, suitable examples of the fluorinated $C_1$–$C_{20}$ alkyl group include a heptadecafluorodecyl group, a pentadecafluorohexyl group and the like, and suitable examples of the $C_1$–$C_{20}$ alkoxy group include a methoxy group, an ethoxy group, a propoxy group, an isopropoxy group, a butoxy group and the like.

As described above, to enhance the water repellency and moisture resistance of the conductive layer, the mercapto compound of formula (3) or (4) above, which has water repellency and oxidation resistance, and fluoroalkylsilane of formula (2) above acting as a water repellent are incorporated into the spray-coated layer composition. The resulting transparent conductive layer has improved water repellency and moisture resistance and a very minor variation in resistance over time. Even when the film stability is lowered due to variations in thickness and composition of the conductive layer, the transparent conductive layer according to the present invention shows improvements in water repellency, moisture resistance, and resistance characteristics, compared to a spray-coated layer formed using fluoroalkylsilane alone.

In the spray-coated layer composition according to the present invention, suitable examples of the metal compound of formula (1) above are the same as described above.

In an embodiment of the present invention, the metal compound of formula (1) above available to form the spray-coated layer may be a mixture of a first silane compound, which is at least one selected from the group consisting of tetraethylorthosilicate, tetramethylorthosilicate, tetraisopropylorthosilicate, methyltrimethoxyorthosilicate, and 3-glycidoxypropyltrimethoxysilane, and a second silane compound, which is at least one selected from the group consisting of vinyltriethoxysilane and phenyltriethoxysilane. In this case, the second silane compound may be added in an amount of 0.1–5 parts by with respect to 100 parts by weight of the first silane compound.

In an alternative embodiment of the present invention, the metal compound of formula (1) above available to form the spray-coated layer may be a mixture of a first silane compound, which is at least one selected from the group consisting of tetraethylorthosilicate, tetramethylorthosilicate, tetraisopropylorthosilicate, methyltrimethoxyorthosilicate, 3-glycidoxypropyltrimethoxysilane, vinyltriethoxysilane, and phenyltriethoxysilane, and a metal compound of formula (5) below as a second silane compound, which is at least one selected from the group consisting of dimethyldimethoxyorthosilicate, diethyldiethoxyorthosilicate, dimethyldiethoxyorthosilicate, and diethyldimethoxyorthosilicate. This composition of the metal compound advantageously enhances the water repellency. In this case, in terms of water repellency of the spray-coated layer, it is preferable that the second silane compound is added in an amount of 0.1–5 parts by weight with respect to 100 parts by weight of the first silane compound.

(5)

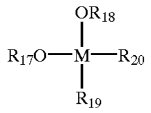

In formula (5) above, M is selected from the group consisting of Si, Ti, Sn, and Zr; $R_{17}$ and $R_{18}$ are, independently, a $C_1$–$C_{20}$ alkyl group or a $C_6$–$C_{20}$ aryl group; and $R_{19}$ and $R_{20}$ are, independently, a $C_1$–$C_{20}$ alkyl group, a $C_2$–$C_{20}$ alkylene group, or a $C_6$–$C_{20}$ aryl group.

Suitable examples of fluoroalkylsilane of formula (2) above include heptadecafluorodecyltriethoxysilane, pentadecafluorohexyltrimethoxysilane, heptadecafluorodecyltrimethoxysilane, heptadecafluorodecyltriisopropoxysilane, heptadecafluorodecyltributoxysilane, di-(heptadecafluorodecyl)diethoxysilane, and tris-(heptadecaflurodecyl)ethoxysilane. Suitable examples of the mercapto compound of formula (3) or (4) above available to form the spray-coated layer are the same as those for the protective layer described above.

The composition for use to form the first transparent conductive layer according to the present invention will be described in greater detail.

The first transparent conductive layer composition consists of a composition for a conductive layer, which has a high refractive index ranging from 1.5 to 2.4, and a composition for a protective layer, which has a low refractive index ranging from 1.3 to 1.5. When a spray-coated layer is formed on the protective layer, the first transparent conductive layer composition according to the present invention may further include a protection layer composition.

The composition for the high-refractive-index conductive layer (referred to as a "conductive layer composition") comprises a metal oxide of an average particle size of 5–5000 nm and a polar solvent.

In this conductive layer composition, the metal oxide has an average particle size of 5–5000 nm and includes at least one selected from the group consisting of tin (Sn)-doped indium oxide (ITO), antimony (Sb)-doped tin oxide, titanium oxide, and ruthenium oxide. If the average particle size of the metal oxide is out of the range, the resulting transparent conductive layer may become opaque. The amount of the metal oxide is in the range of 0.01–20 parts by weight based on 100 parts by weight of the conductive layer composition. If the metal oxide is added in an amount greater than 20 parts by weight, the resulting transparent conductive layer may be opaque. If the metal oxide is added in an amount less than 0.01 parts by weight, undesirable surface resistance characteristics may result. If the metal oxide has an average particle size less than 5 nm, the conductive layer may have a reduced conductivity. If the metal oxide has an average particle size larger than 5000 nm, the metal oxide may less dispersible in the conductive layer.

The polar solvent to disperse the metal oxide may be water, ethanol, methanol, butanol, methylcellosolve, etc. The polar solvent may be used in an amount of 80–99.99 parts by weight based on 100 parts by weight of the conductive layer composition. If the amount of the polar solvent exceeds 99.99 parts by weight, undesirable surface resistance characteristics may result. If the amount of the polar solvent is less than 80 parts by weight, coating properties may be lowered.

The composition for the low-refractive-index protective layer (referred to as a "protective layer composition") comprises a metal compound of formula (1) above, a mercapto compound of formula (3) or (4), and a polar solvent. The mercapto compound acts as an electrical conductivity enhancer for the conductive layer.

In this protective layer composition, the metal compound of formula (1) above, for example, silicon alkoxide, is a material which is changed to silica by hydrolysis. As the protective layer composition is thermally treated after being coated, a silica network structure is formed.

In the protective layer composition, the mercapto compound of formula (3) or (4) above may be at least one selected from the group consisting of 3-mercaptopropyltrimethoxysilane, 3-mercaptopropylmethyldimethoxysilane, 3-mercapto-1,2-propanediol, 1-mecapto-2-propanol, 3-mercaptopropionic acid, di-(3-mercaptopropyl)dimethoxysilane, and tris-(3-mercaptopropyl)methoxysilane. The mercapto compound of formula (3) or (4) may be used in an amount of 1–15 parts by weight, preferably, 6–11 parts by weight, based on 100 parts by weight of the metal compound of formula (1) above. If the amount of the mercapto compound is less than 1 part by weight, desirable low-resistance characteristics may not result. If the amount of the mercapto compound is greater than 15 parts by weight, film hardness may be reduced.

In formulating the protective layer composition, similar polar solvents as used to prepare the conductive layer composition are used to dissolve or disperse the metal compound of formula (1) and the mercapto compound of formula (3) or (4). Suitable examples of the polar solvent for the protective layer composition include at least one selected from the group consisting of ethanol, methanol, butanol, isopropanol, methylethylketone, methylcellosolve, and ethylcellosolve. The polar solvent may be used in an amount of 1000–4000 parts by weight based on 100 parts by weight of the metal compound of formula (1) above. If the amount of the polar solvent exceeds 4000 parts by weight, desirable film hardness may not result. If the amount of the polar solvent is less than 1000 parts by weight, unsatisfactory coating properties may result.

Preferably, the protective layer composition may further comprise a hydrolytic catalyst in an amount of 0.1–0.9 mole, more preferably 0.3–0.7 mole, with respect to 1 mole of the metal compound of formula (1) above. The hydrolytic catalyst may be at least one selected from the group consisting of nitric acid, hydrochloric acid, phosphoric acid, and sulfuric acid.

In addition, the spray-coated layer composition is formulated by mixing a metal compound of formula (1) above, fluoroalkylsilane of formula (2) above, a mercapto compound of formula (3) or (4), and a polar solvent. The spray-coated layer composition according to the present invention may further comprise a metal compound of formula (5) above if necessary.

Each of fluoroalkylsilane of formula (2) above and the mercaptor compound of formula (3) or (4) above is used in an amount of 1–15 parts by weight, preferably 7–12 parts by weight, based on 100 parts by weight of the metal compound of formula (1) above. If the amount of the fluoroalkylsilane is less than 1 part by weight, water repellency may be decreased. If the amount of the fluoroalkylsilane exceeds 15 parts by weight, the resulting spray-coated layer may have an uneven surface.

In the spray-coated layer composition, methanol, ethanol, isopropanol, methylethylketone and the like may be used as the polar solvent. The polar solvent is used in an amount of 1000–4000 parts by weight, preferably 2300–3300 parts by weight, based on 100 parts by weight of the metal compound of formula (1) above. If the amount of the polar solvent is less than 1000 parts by weight, dispersion stability of the spray-coated layer may be lowered. If the amount of the polar solvent exceeds 4000 parts by weight, the resulting spray-coated layer may be less water repellent.

The spray-coated layer composition may further comprise a hydrolytic catalyst. Nitric acid, hydrochloric acid, phosphoric acid, sulfuric acid and the like can be used as the hydrolytic catalyst. The hydrolytic catalyst may be used in an amount of 0.1–0.9 mole, preferably 0.3–0.7 mole, with respect to 1 mole of the metal compound of formula (1) above. If a hydrolytic catalyst less than 0.1 mole is used, the manufacturing process may be extended. If a hydrolytic catalyst more than 0.9 mole is used, it may be difficult to control the manufacturing process.

The composition for use to form a second transparent conductive layer according to the present invention will be described in greater detail.

The second transparent conductive layer according to the present invention comprises a conductive layer formed of a metal oxide, a protective layer, and a spray-coated layer formed on the protective layer with an uneven surface configuration to scatter incident external light and thus prevent light reflection. The protective layer is formed using a composition containing a metal compound of formula (1) below and a polar solvent. The conductive layer and the spray-coated layer are formed using the same compositions as used to form the first transparent conductive layer.

(1)

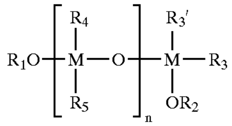

In formula (1) above, M is selected from the group consisting of Si, Ti, Sn, and Zr; $R_1$ is a $C_1$–$C_{20}$ alkyl group or $-M(R_{14}R_{15}R_{16})$ where $R_{14}$, $R_{15}$, and $R_{16}$ are, independently, a $C_1$–$C_{20}$ alkyl group, a $C_1$–$C_{20}$ alkoxy group, or a $C_6$–$C_{20}$ aryl group; $R_2$ is a $C_1$–$C_{20}$ alkyl group; at least one of $R_3$ and $R_3'$ is a $C_1$–$C_{20}$ alkoxy group, and the remaining group is a $C_1$–$C_{20}$ alkyl group, a $C_1$–$C_{20}$ alkoxy group, a $C_2$–$C_{20}$ alkylene group, or a $C_6$–$C_{20}$ aryl group; at least one of $R_4$ and $R_5$ is a $C_1$–$C_{20}$ alkoxy group, and the remaining group is a $C_1$–$C_{20}$ alkyl group, a $C_2$–$C_{20}$ alkylene group, or a $C_6$–$C_{20}$ aryl group; and n is an integer from 0 to 20.

Hereinafter, methods for manufacturing the first and second transparent conductive layers according to the present invention on, for example, a glass CRT panel will be described.

In manufacturing the first transparent conductive layer, a metal oxide of an average particle size of 5–5000 nm is dispersed in a polar solvent to prepare a conductive layer composition. A top surface of the glass panel is coated with the conductive layer composition and dried at 30–100° C. to form a conductive layer. The drying process may be not performed if necessary.

Separately, a metal compound of formula (1) above, a polar solvent, and a mercapto compound of formula (3) or (4) above are mixed and aged for a predetermined period to prepare a protective layer composition. Advantageously, this aging process increases film hardness and improves coating properties.

The conductive layer is coated with the prepared protective layer composition, dried, and calcinated to form a first transparent conductive layer 10, as shown in FIG. 1A. Alternatively, the drying process may be omitted if necessary.

Figure 2:
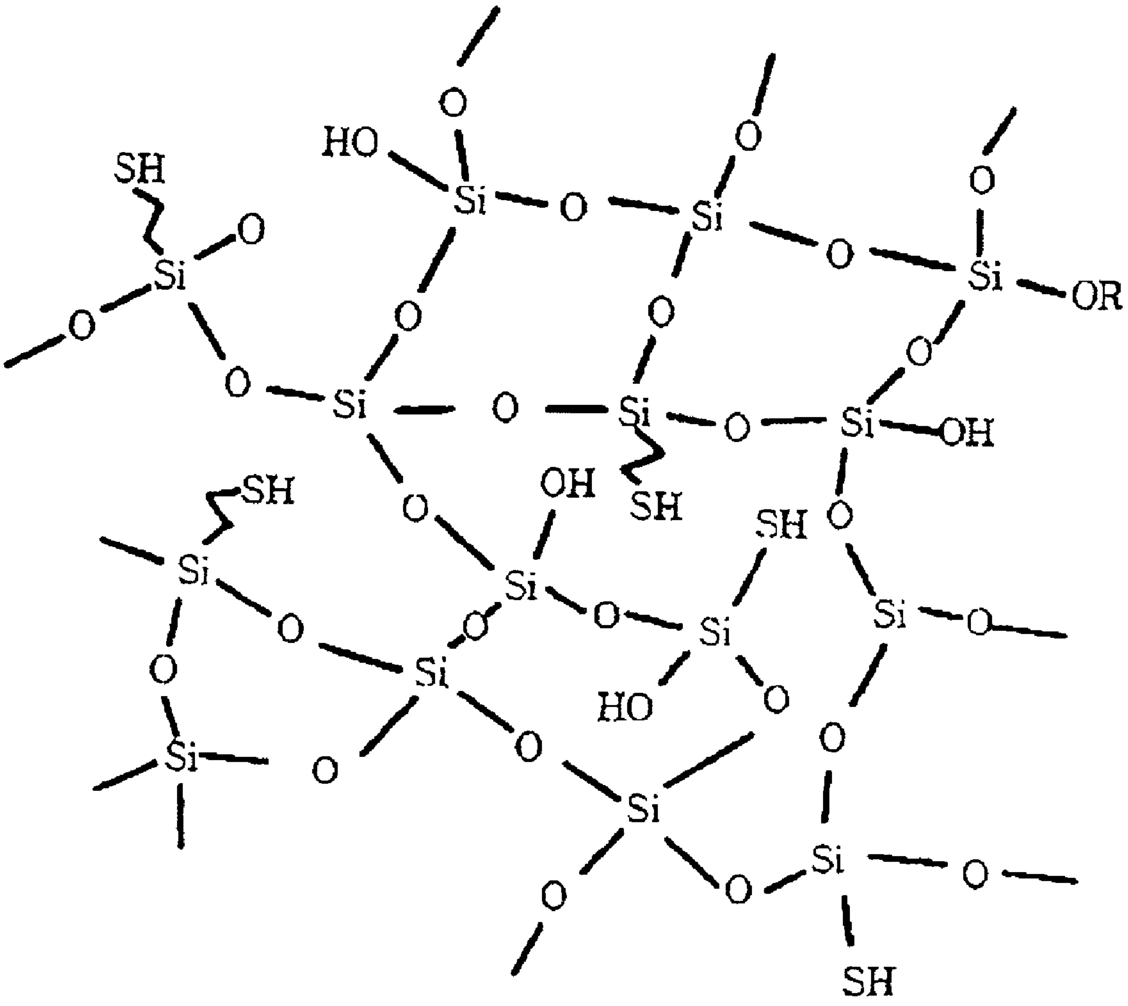
FIG. 2 illustrates a network structure formed as a result of reaction between mercapto compound and silicon alkoxide in the manufacture of a transparent conductive layer according to the present invention.

A network structure between silica and mercapto compound is formed during calcination, as shown in FIG. 2. This calcination is performed at, preferably a temperature of 100–400° C. If the calcination temperature is above 400° C., the types of available substrates may be limited. If the calcination temperature is less than 100° C., the film hardness may be not strong enough.

The conductive layer and the protective layer can be coated, but not limited to, using a pin coating or roll coating method.

The resulting first transparent conductive layer 10, as shown in FIG. 1A, has the conductive layer 12 on the surface of a CRP panel 11 and the protective layer 13 on the conductive layer 12. The conductive layer 12 is formed of a metal oxide and inherently has no binding force. The conductive layer 12 has a thickness of 50–3000 nm. If the conductive layer 12 has a thickness less than 50 nm, the surface resistance characteristics may be lowered. If the conductive layer 12 has a thickness greater than 3000 nm, the moisture resistance may be reduced.

The protective layer 13 formed on the conductive layer 12 has a network structure, which is formed by a hydrolyzed and polycondensated product of a metal compound of formula (1) above, i.e., silica when silica alkoxide is used as the metal compound, a mercapto compound of formula (3) or (4) above and/or its hydrozyed and polycondensated product. This composition of the protective layer 13 maintains the film hardness and gives moisture resistance. The protective layer 13 has a thickness of 50–200 nm and a refractive index of 1.4–1.5, which is smaller than the conductive layer 12 which has a refractive index of 1.5–2.4. If the protective layer 13 has a thickness less than 50 nm, the moisture resistance may be reduced. If the protective layer 13 has a thickness greater than 200 nm, it may be undesirable in terms of optical characteristics including reflectivity.

In the protective layer 13, the content of each of the mercapto compound of formula (3) or (4) above and/or the hydrolyzed and polycondensated product of the mercapto compound is preferably in the range of 1–15 with respect to 100 parts by weight of the hydrolyzed and polycondensated product of the metal compound of formula (1) above.

When the transparent conductive layer 10 according to the present invention is applied to a front panel surface of an image display device, electromagnetic waves and electromagnetic fields can be effectively shielded with a surface resistance of about $10^3$ Σ/~.

Reflection occurring at the front panel of an image display device makes a display image invisible. However, the image display device according to the present invention whose front panel is coated with the transparent conductive layer capable of preventing visible and near infrared rays from being reflected has good anti-reflection effects.

Figure 1B:
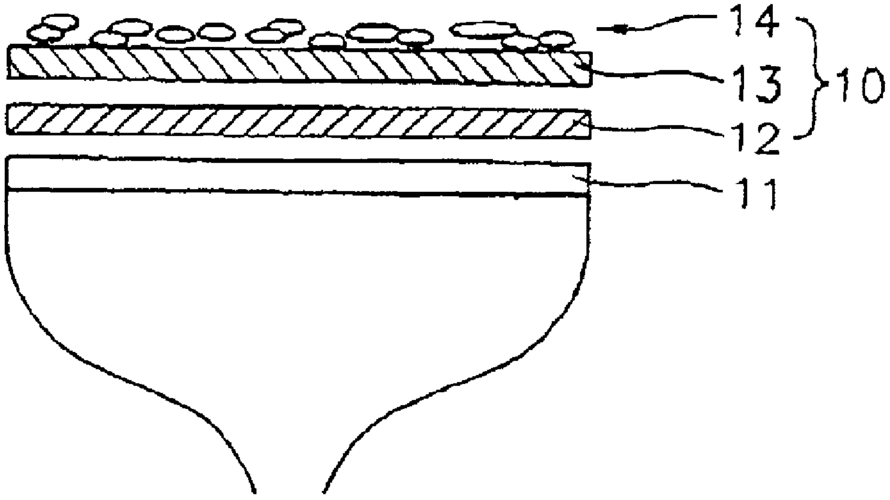

A transparent conductive layer according to the present invention may additionally include a spray-coated layer 14 on the protective layer 13, as shown in FIG. 1B. To form the spray-coated layer 14, the protective layer 13 is coated with a spray-coated layer composition, which contains a metal compound of formula (1) above, fluoroalkylsilane of formula (2) above, a mercapto compound of formula (3) or (4), and a polar solvent. Next, the resulting structure is dried and calcinated. Drying temperature is in the range of 30–100° C. The drying process may be omitted if necessary. Calcination temperature is in the range of 100–400° C. If the calcination temperature is less than 100° C., the film hardness may be reduced. If the calcination temperature is above 100° C., the image display device may be likely to be broken.

The resulting spray-coated layer contains a hydrolyzed and polycondensated product of silicon alkoxide, fluorosilane and/or its hydrolyzed and polycondensated product, and the mercapto compound and/or its hydrolyzed and polycondensated product, and has a network structure of this composition. This network structure of the spray-coated layer can be confirmed using IR or Raman spectroscopy.

Alternatively, the spray-coated layer 14 may further contain a hydrolyzed and polycondenstated product of a metal compound of formula (5) above.

Figure 3:
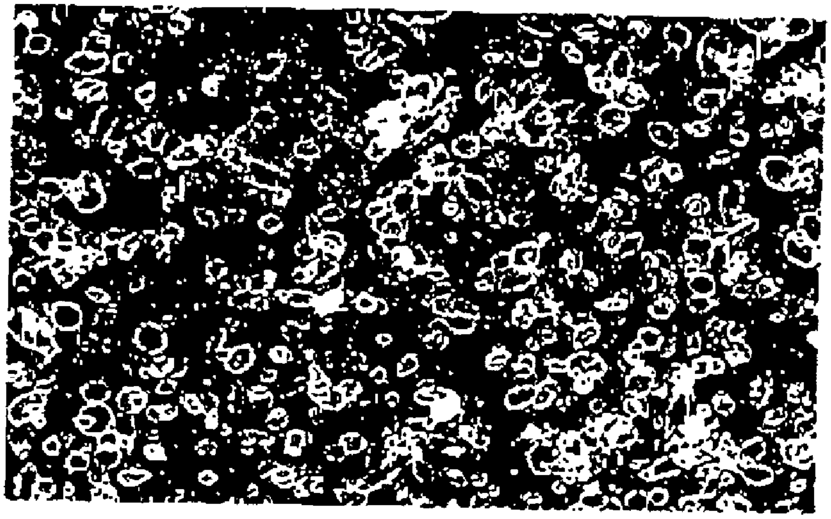
FIG. 3 is an optical microscopic photograph of a spray-coated layer composition according to the present invention coated on a protective layer as scattered microdroplets.

FIG. 3 is an optical microscopic photograph showing a number of microdroples of the spray-coated layer composition coated on the protective layer 13 in manufacturing a transparent conductive layer. As is apparent from FIG. 3, the spray-coated layer composition is coated on the protective layer 13 as scattered microdroplets and thus, the resulting spray-coated layer is formed as a non-continuous layer.

The spray-coated layer composition according to the present invention is spray coated at a rate of 0.5–2.0 L/h. If the spray coating rate is lower than the lower limit, it may be difficult to maintain the water repellency, moisture resistance, or reflection characteristics of the transparent conductive layer. If the spray coating rate is greater than the upper limit, reflection may increase with reduced transparency.

As described above, the three-layered structure of the first conductive layer according to the present invention, including the conductive layer 12, the protective layer 13, and the spray-coated layer 14, can be easily identified by surface analysis such as scanning electron microscopy (SEM) or transmission electron microscopy (TEM).

In manufacturing the second transparent conductive layer according to the present invention, as in the manufacture of the first transparent conductive layer, a metal oxide of an average particle size of 5–5000 nm is dispersed in a polar solvent to prepare a conductive layer composition. A top surface of a glass panel is coated with the conductive layer composition and dried at 30–100° C. to form a conductive layer. The drying process may be not performed if necessary.

Separately, a metal compound of formula (1) above is dispersed in a polar solvent to prepare a protective layer composition. The conductive layer is coated with this protective layer composition and dried at 30–100° C. to form a protective layer. The drying process may be omitted if necessary, as in formation of the conductive layer.

The conductive layer and the protective layer can be coated, but not limited to, using a pin coating or roll coating method. In the present invention, spin coating is preferred in terms of film uniformity.

Figure 4:
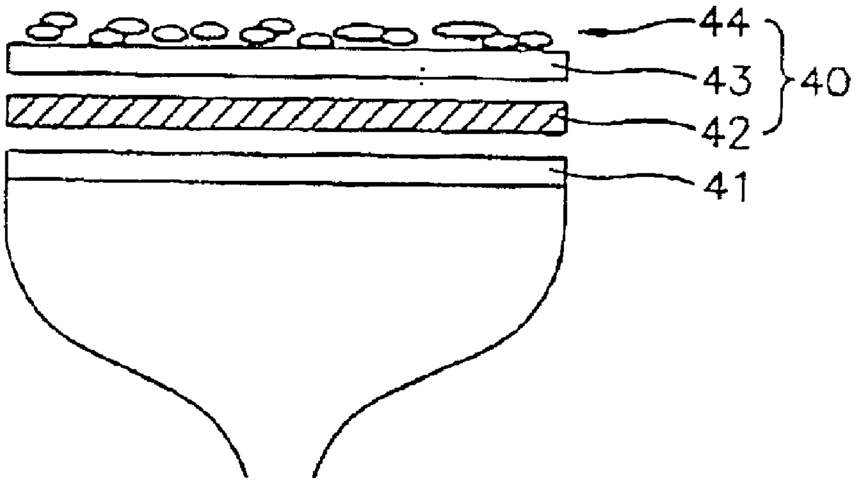
FIG. 4 is a sectional view showing a stacked structure of a transparent conductive layer formed on a CRT panel according to the present invention.

As in the manufacture of the first transparent conductive layer described above, a spray-coated layer composition containing a metal compound of formula (1) above, fluoroalkylsilane of formula (2) above, a mercapto compound of formula (3) or (4), and a polar solvent is prepared. Next, the protective layer is coated with the spray-coated layer composition, dried, and calcinated to form a spray-coated layer. The result is a second transparent layer 40, as shown in FIG. 4. The drying and calcination processes are performed in the same manner as in the manufacture of the first transparent conductive layer described above.

The resulting second transparent conductive layer 40, as shown in FIG. 4, has the conductive layer 42 on the surface of a CRT panel 41, and the protective layer 43 and the spray-coated layer 44 to protect the conductive layer 42, which are stacked one another. The compositions and thicknesses of the conductive layer 42 and the spray-coated layer 44 are the same as those of the first transparent conductive layer described above.

The protective layer 43 is formed of a hydrolyzed and polycondensated product of the metal compound of formula (1) above and has a thickness of 50–200 nm. If the protective layer 43 has a thickness less than 50 nm, the moisture resistance may be reduced. If the protective layer 43 has a thickness greater than 200 nm, optical characteristics including reflectivity may be reduced.

The second transparent conductive layer 40 formed through the processes described above can be applied to the front panel of an image display device, such as a cathode ray tube (CRT), vacuum fluorescent display (VFC), plasma display panel (PDP), and liquid crystal display (LCD). Such an image display device with the transparent conductive layer according to the present invention on its front panel has excellent durability and electromagnetic wave shielding properties.

The present invention will be described in greater detail by means of the following examples. The following examples are for illustrative purposes and are not intended to limit the scope of the invention.

EXAMPLE 1

4 g of indium thin oxide was dispersed in 100 mL (81.6 g) of ethanol. The dispersion was spin coated on the glass panel of a cathode ray tube at 130 rpm and dried to form a conductive layer.

Subsequently, 1 g of tetraethylorthosilicate was dissolved in 100 mL (81.6 g) of ethanol and reacted with an addition of 0.2 mL of nitric acid. The resulting composition was spin coated on the conductive layer at 130 rpm and dried to form a protective layer.

Separately, a mixture of 1.4 g of tetraethylorthosilicate, 0.1 g of heptadecafluorodecyltrimethoxysilane and 0.1 g of 3-mercaptopropyltrimethoxysilane was dissolved in 100 mL (81.6 g) of methanol with an addition of 0.2 mL of nitric acid (60%, 0.4 mol with respect to 1 mol of silicon alkoxide) to prepare a spray layer composition. The resulting composition was spray coated on the protective layer using a spray gun and dried to form a spray-coated layer, thereby resulting in a transparent conductive layer.

EXAMPLE 2

A transparent conductive layer was formed in the same manner as in Example 1, except that the amount of 3-mercaptopropyltrimethoxysilane in the spray-coated layer composition was varied to 0.2 g.

EXAMPLE 3

A transparent conductive layer was formed in the same manner as in Example 1, except that 1-mercaptopropyltrimethoxysilane was used instead of 3-mercaptopropyltrimethoxysilane to prepare the spray-coated layer composition.

EXAMPLE 4

A transparent conductive layer was formed in the same manner as in Example 1, except that 3-mercapto-1,2-propanediol was used instead of 3-mercaptopropyltrimethoxysilane to prepare the spray-coated layer composition.

EXAMPLE 5

A transparent conductive layer was formed in the same manner as in Example 1, except that 3-mercaptopropionic acid was used instead of 3-mercaptopropyltrimethoxysilane to prepare the spray-coated layer composition.

EXAMPLE 6

A transparent conductive layer was formed in the same manner as in Example 1, except that 3-mercaptopropionic acid was used instead of heptadecafluorodecylmethoxysilane to prepare the spray-coated layer composition.

EXAMPLE 7

A transparent conductive layer was formed in the same manner as in Example 1, except that the amount of heptadecafluorodecyltrimethoxysilane in the spray-coated layer composition was varied to 0.2 g.

EXAMPLE 8

A transparent conductive layer was formed in the same manner as in Example 1, except that a mixture of 1.4 g of tetraethylorthosilicate and 0.05 g of vinyltriethoxysilane was used, instead of 1.4 g of tetraethylorthosilicate, to prepare the spray-coated layer composition.

EXAMPLE 9

A transparent conductive layer was formed in the same manner as in Example 1, except that a mixture of 1.4 g of tetraethylorthosilicate and 0.05 g of phenyltriethoxysilane was used, instead of 1.4 g of tetraethylorthosilicate, to prepare the spray-coated layer composition.

EXAMPLE 10

A transparent conductive layer was formed in the same manner as in Example 1, except that 1.4 g of an oligomer (n=3) prepared by hydrolysing and polycondensating tetraethylorthosilicate was used, instead of 1.4 g of tetraethylorthosilicate, to prepare the spray-coated layer composition.

EXAMPLE 11

To a solvent mixture of 50 g of ethanol, 30 g of methanol, 10 g of isopropyl alcohol, and 7.5 g of n-butanol was added 2.1 g of grounded ITO of a 100-nm average particle diameter to prepare a conductive layer composition.

Separately, to a solvent mixture of 50 g of ethanol, 30 g of methanol, 10 g of isopropyl alcohol, and 7.25 g of n-butanol were added 2.67 g of tetraethyl silicate and 0.08 g of mercaptopropyltrimethoxysilane. The mixture was stirred and aged at 60° C. for 24 hours to prepare a protective layer composition.

The conductive layer composition was spin coated on a substrate, dried, and coated with the protective layer composition. The resulting structure was thermally treated at 200° C. for 30 minutes to form a transparent conductive layer.

EXAMPLE 12

A transparent conductive layer was formed in the same manner as in Example 11, except that the protective layer composition was slightly changed. To a solvent mixture of 50 g of ethanol, 30 g methanol, 10 g of isopropyl alcohol, and 7.25 g of n-butanol were added 2.67 g of tetraethylorthosilicate and 0.16 g of 3-mercaptopropyltrimethoxysilane. The mixture was stirred and aged at 60° C. for 24 hours to prepare a protective layer composition.

COMPARATIVE EXAMPLE 1

A transparent conductive layer was formed in the same manner as in Example 1, except that 3-mercaptopropyltrimethoxysilane was not used to prepare the spray-coated layer composition.

COMPARATIVE EXAMPLE 2

A transparent conductive layer was formed in the same manner as in Example 11, except that 3-mercaptopropyltrimethoxylsilane was not used to prepare the protective layer composition.

The transparent conductive layers formed in Examples 1 through 10 and Comparative Example 1 were determined for the following characteristics. The results are shown in Table 1.

1) Film Hardness (H)

Film hardness at the surface was determined using a pencil hardness method. Standard pencils with a tip hardness in H were used. The cross-section of each pencil tip was polished to be planar and was moved once on the surface of each conductive layer at a 45° tilt and a speed of 0.5 cm/mm with the application of a load of 1 kg to the pencil in a vertical direction. It was observed whether the surface of the conductive layer was scratched or not. The same test was performed while changing the pencils having different hardnesses. The largest hardness of the pencils at which no scratch was observed for a conductive layer was read as the hardness of the conductive layer.

2) Film Resistance (Σ)

Variation in resistance was observed after the transparent conductive layers were left at 45° C. and 95% RH for 24 hours.

3) Moisture Resistance

After the transparent conductive layers were left at 45° C. and 95% RH for 24 hours, the surfaces of the transparent conductive layers were visually observed to determine whether the surfaces were stained or not.

TABLE 1

| Example | Moisture Resistance Test | Film Resistance (kΣ) | Hardness (H) | Stained or not |
|---|---|---|---|---|
| Example 1 | Before | 10.5 | 9 | Not stained |
| | After | 13.1 | 9 | Not stained |
| Example 2 | Before | 9.7 | 9 | Not stained |
| | After | 12.8 | 9 | Not stained |
| Example 3 | Before | 11.2 | 9 | Not stained |
| | After | 13.9 | 9 | Not stained |
| Example 4 | Before | 11.5 | 9 | Not stained |
| | After | 14.2 | 9 | Not stained |
| Example 5 | Before | 12.1 | 9 | Not stained |
| | After | 14.8 | 9 | Not stained |
| Example 6 | Before | 10.8 | 9 | Not stained |
| | After | 13.7 | 9 | Not stained |
| Example 7 | Before | 9.5 | 9 | Not stained |
| | After | 13.4 | 9 | Not stained |
| Example 8 | Before | 10.9 | 9 | Not stained |
| | After | 13.6 | 9 | Not stained |
| Example 9 | Before | 11.3 | 9 | Not stained |
| | After | 13.2 | 9 | Not stained |
| Example 10 | Before | 10.2 | 9 | Not stained |
| | After | 13.8 | 9 | Not stained |
| Comparative | Before | 13.1 | 9 | Not stained |
| Example 1 | After | 21.4 | 9 | Stained |

As is apparent from Table 1, Examples 1 through 7 where the spray-coated layers contain 3-mercaptopropyltrimethoxysilane show the same hardness as Comparative Example 1 where 3-mercaptopropyltrimethoxysilane was not used. Also, the initial film resistance and a change in resistance over time after the moisture resistance test are very small for each transparent conductive layer. No stains, which occur due to moisture absorption, are observed in the transparent conductive layers of Examples 1 through 10. The transparent conductive layers of Examples 3 through 7 are similar to those of Examples 1 and 2 in terms of the surface resistance, hardness, and whether stains occur or not.

As in Examples 1 through 7, the transparent conductive layers of Examples 8 and 9 show low initial film resistances and minor variations in resistance over time after the moisture resistance test. Also, the transparent conductive layers are not stained by moisture absorption. The transparent conductive layers of Examples 8 and 9 show excellent water repellency, moisture resistance, and film hardness. The transparent conductive layer of Example 10 shows similar characteristics including the initial film resistance, as in Examples 8 and 9.

The transparent conductive layers manufactured in Examples 11 and 12 and Comparative Example 2 were determined for their surface resistance. As a result, the surface resistance was 8.5 Σ/~ for the transparent conductive layer of Example 11 and 7.5 Σ/~ for Example 2, which are lower than Comparative Example 2 at 13 Σ/~.

In addition, the transparent conductive layers manufactured in Examples 11 and 12 were determined for their resistance stability. Resistance Stability was determined by a change in resistance before and after 8-hour dipping in water at 65EC. As a result, the resistance values of the transparent conductive layers of Examples 11 and 12 are mostly unchanged after dipping in water with excellent resistance stability.

A transparent conductive layer in a 3-layered stack according to the present invention has enhanced water repellency at the outermost spray-coated layer containing a mercapto compound and fluoroalkylsilane and thus can maintain a high moisture resistance and film hardness under high-temperature, high-humidity conditions. Also, the transparent conductive layer effectively suppresses oxidation of the metal oxide therein, so that a reduction in moisture resistance and an increase in resistance, which occur as a result of variations in the composition and thickness of the conductive layer, are prevented.

When a transparent conductive layer according to the present invention is manufactured in a 2-layered stack using the composition, the manufacturing costs can be reduced with low-reflectivity and low-resistance characteristics, compared to the prior art. The transparent conductive layer can be applied to the front panel of an image display apparatus such as a cathode ray tube (CRT), vacuum fluorescent display (VFC), plasma display panel (PDP), and liquid crystal display (LCD). When the transparent conductive layer according to the present invention is formed on the front panel of such a display device, it is possible to effectively shield electromagnetic waves and electromagnetic fields with a low surface resistance of about $10^3$ Σ/~.

While this invention has been particularly shown and described with reference to preferred embodiments thereof, it will be understood by those skilled in the art that various changes in form and details may be made therein without departing from the spirit and scope of the invention as defined by the appended claims.

What is claimed is:

1. A spray-coated layer composition comprising a metal compound of formula (1) below, fluoroalkylsilane of formula (2) below, a mercapto compound of formula (3) or (4) below, and a polar solvent:

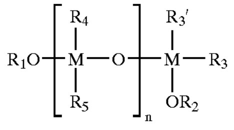

(1)

where M is selected from the group consisting of Si, Ti, Sn, and Zr;

$R_1$ is a $C_1$–$C_{20}$ alkyl group or -$M(R_{14}R_{15}R_{16})$ where $R_{14}$, $R_{15}$, and $R_{16}$ are, independently, a $C_1$–$C_{20}$ alkyl group, a $C_1$–$C_{20}$ alkoxy group, or a $C_6$–$C_{20}$ aryl group;

$R_2$ is a $C_1$–$C_{20}$ alkyl group;

at least one of $R_3$ and $R_3$' is a $C_1$–$C_{20}$ alkoxy group, and the remaining group is a $C_1$–$C_{20}$ alkyl group, a $C_1$–$C_{20}$ alkoxy group, a $C_2$–$C_{20}$ alkylene group, or a $C_6$–$C_{20}$ aryl group;

at least one of $R_4$ and $R_5$ is a $C_1$–$C_{20}$ alkoxy group, and the remaining group is a $C_1$–$C_{20}$ alkyl group, a $C_2$–$C_{20}$ alkylene group, or a $C_6$–$C_{20}$ aryl group; and n is an integer from 0 to 20, (2)

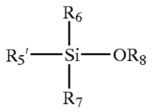

where $R_5$' is a fluorinated $C_1$–$C_{20}$ alkyl group; $R_6$ and $R_7$ are, independently, a $C_1$–$C_{20}$ alkoxy group or a fluorinated $C_1$–$C_{20}$ alkyl group; and $R_8$ is a $C_1$–$C_{20}$ alkyl group, $R_9SH$ (3)

where $R_9$ is a $C_1$–$C_{20}$ alkyl group, a $C_1$–$C_{20}$ alkyl group with a hydroxy group, a $C_1$–$C_{20}$ hydroxyalkyl group with a hydroxy substituent, or —$(CH_2)_k$COOH, where k is an integer from 1 to 10, and (4)

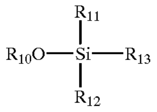

where $R_{10}$ is a $C_1$–$C_{20}$ alkyl group; $R_{11}$ and $R_{12}$ are, independently, a $C_1$–$C_{20}$ alkyl group, a $C_1$–$C_{20}$ alkoxy group, or a $C_1$–$C_{20}$ alkyl group with mercapto group; and $R_{13}$ is a $C_1$–$C_{20}$ alkyl group with a mercapto (—SH) group, wherein the fluoroalkylsilane of said formula (2) is at least one selected from the group consisting of heptadecafluorodecyltriethoxysilane, pentadecafluorohexytrimethoxysilane, heptadecafluorodecyltrimethoxysilane, heptadecafluorodecyltriisopropoxysilane, heptadecafluorodecyltributoxysilane, di-(heptadecafluorodecyl)diethoxysilane, and tris-(heptadecafluorodecyl)ethoxysilane, and the fluoroalkylsilane of said formula (2) is contained in an amount of 1–15 parts by weight based on 100 parts by weight of the metal compound of formula (1).

2. A spray-coated layer composition comprising a metal compound of formula (1) below, fluoroalkylsilane of formula (2) below, a mercapto compound of formula (3) or (4) below, and a polar solvent:

(1)

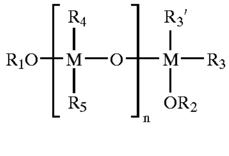

where M is selected from the group consisting of Si, Ti, Sn, and Zr;

$R_1$ is a $C_1$–$C_{20}$ alkyl group or -M($R_{14}R_{15}R_{16}$) where $R_{14}$, $R_{15}$, and $R_{16}$ are, independently, a $C_1$–$C_{20}$ alkyl group, a $C_1$–$C_{20}$ alkoxy group, or a $C_6$–$C_{20}$ aryl group;

$R_2$ is a $C_1$–$C_{20}$ alkyl group;

at least one of $R_3$ and $R_3$' is a $C_1$–$C_{20}$ alkoxy group, and the remaining group is a $C_1$–$C_{20}$ alkyl group, a $C_1$–$C_{20}$ alkoxy group, a $C_2$–$C_{20}$ alkylene group, or a $C_6$–$C_{20}$ aryl group;

at least one of $R_4$ and $R_5$ is a $C_1$–$C_{20}$ alkoxy group, and the remaining group is a $C_1$–$C_{20}$ alkyl group, a $C_2$–$C_{20}$ alkylene group, or a $C_6$–$C_{20}$ aryl group; and n is an integer from 0 to 20, (2)

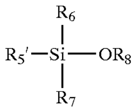

where $R_5$' is a fluorinated $C_1$–$C_{20}$ alkyl group; $R_6$ and $R_7$ are, independently, a $C_1$–$C_{20}$ alkoxy group or a fluorinated $C_1$–$C_{20}$ alkyl group; and $R_8$ is a $C_1$–$C_{20}$ alkyl group, $R_9SH$ (3)

where $R_9$ is a $C_1$–$C_{20}$ alkyl group, a $C_1$–$C_{20}$ alkyl group with a hydroxy group, a $C_1$–$C_{20}$ hydroxyalkyl group with a hydroxy substituent, or —$(CH_2)_k$COOH, where k is an integer from 1 to 10, and (4)

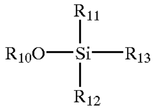

where $R_{10}$ is a $C_1$–$C_{20}$ alkyl group; $R_{11}$ and $R_{12}$ are, independently, a $C_1$–$C_{20}$ alkyl group, a $C_1$–$C_{20}$ alkoxy group, or a $C_1$–$C_{20}$ alkyl group with a mercapto group; and $R_{13}$ is a $C_1$–$C_{20}$ alkyl group with a mercapto (—SH) group, wherein the mercapto compound of said formula (3) or (4) is at least one selected from the group consisting of 3-mercaptopropyltrimethoxysilane, 3-mercaptopropylmethyldimethoxysilane, 3-mercapto-1,2-propanediol, 1-mercapto-2-propanol, 3-mercaptopropionic acid, di-(3-mercaptopropyl)dimethoxysilane, and tris-(3-mercaptopropyl)methoxysilane, and the mercapto compound is contained in an amount of 1–15 parts by weight based on 100 parts by weight of the metal compound of said formula (1).

3. A transparent conductive layer comprising a conductive layer containing a metal oxide and a protective layer formed on the conductive layer, the protective layer containing a hydrolyzed and polycondensated product of a metal compound of formula (1) below and at least one of a mercapto compound of formula (3) or (4) below and its hydrolyzed and polycondensated product:

(1)

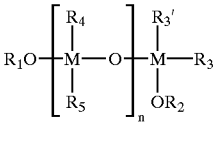

where M is selected from the group consisting of Si, Ti, Sn, and Zr;

$R_1$ is a $C_1$–$C_{20}$ alkyl group or -M($R_{14}R_{15}R_{16}$) where $R_{14}$, $R_{15}$, and $R_{16}$ are, independently, a $C_1$–$C_{20}$ alkyl group, a $C_1$–$C_{20}$ alkoxy group, or a $C_6$–$C_{20}$ aryl group;

$R_2$ is a $C_1$–$C_{20}$ alkyl group;

at least one of $R_3$ and $R_3$' is a $C_1$–$C_{20}$ alkoxy group, and the remaining group is a $C_1$–$C_{20}$ alkyl group, a $C_1$–$C_{20}$ alkoxy group, a $C_2$–$C_{20}$ alkylene group, or a $C_6$–$C_{20}$ aryl group;

at least one of $R_4$ and $R_5$ is a $C_1$–$C_{20}$ alkoxy group, and the remaining group is a $C_1$–$C_{20}$ alkyl group, a $C_2$–$C_{20}$ alkylene group, or a $C_6$–$C_{20}$ aryl group; and n is an integer from 0 to 20, $R_9SH$ (3)

where $R_9$ is a $C_1$–$C_{20}$ alkyl group, a $C_1$–$C_{20}$ alkyl group with a hydroxy group, a $C_1$–$C_{20}$ hydroxyalkyl group with a hydroxy substituent, or $-(CH_2)_kCOOH$, where k is an integer from 1 to 10, and

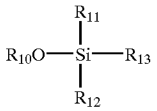
(4)

where $R_{10}$ is a $C_1$–$C_{20}$ alkyl group; $R_{11}$ and $R_{12}$ are, independently, a $C_1$–$C_{20}$ alkyl group, a $C_1$–$C_{20}$ alkoxy group, or a $C_1$–$C_{20}$ alkyl group with a mercapto group; and $R_{13}$ is a $C_1$–$C_{20}$ alkyl group with a mercapto (—SH) group, wherein the mercapto compound of said formula (3) or (4) is at least one selected from the group consisting of 3-mercaptopropyltrimethoxysilane, 3-mercaptopropylmethyldimethoxysilane, 3-mercapto-1,2-propanediol, 1-mercapto-2-propanol, 3-mercaptopropionic acid, di-(3-mercaptopropyl)dimethoxysilane, and tris-(3-mercaptopropyl)methoxysilane, and the mercapto compound is contained in an amount of 1–15 parts by weight based on 100 parts by weight of the metal compound of said formula (1).

4. A transparent conductive layer comprising a conductive layer containing a metal oxide and a protective layer and spray-coated layer sequentially formed to protect the conductive layer, the spray-coated layer containing a hydrolyzed and polycondensated product of a metal compound of formula (1) below, at least one of fluoroalkylsilane of formula (2) below and its hydrolyzed and polycondensated product, and at least one of a mercapto compound of formula (3) or (4) below and its hydrolyzed and polycondensated product, and the protective layer containing a hydrolyzed and polycondensated product of the metal compound of said formula (1):

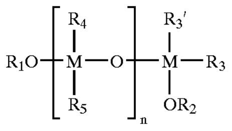
(1)

where M is selected from the group consisting of Si, Ti, Sn, and Zr;

- $R_1$ is a $C_1$–$C_{20}$ alkyl group or -$M(R_{14}R_{15}R_{16})$ where $R_{14}$, $R_{15}$, and $R_{16}$ are, independently, a $C_1$–$C_{20}$ alkyl group, a $C_1$–$C_{20}$ alkoxy group, or a $C_6$–$C_{20}$ aryl group;
- $R_2$ is a $C_1$–$C_{20}$ alkyl group;
- at least one of $R_3$ and $R_3$' is a $C_1$–$C_{20}$ alkoxy group, and the remaining group is a $C_1$–$C_{20}$ alkyl group, a $C_1$–$C_2$a alkoxy group, a $C_2$–$C_{20}$ alkylene group, or a $C_6$–$C_{20}$ aryl group;
- at least one of $R_4$ and $R_5$ is a $C_1$–$C_{20}$ alkoxy group, and the remaining group is a $C_1$–$C_{20}$ alkyl group, a $C_2$–$C_{20}$ alkylene group, or a $C_6$–$C_{20}$ aryl group; and n is an integer from 0 to 20,

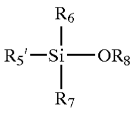
(2)

where $R_5$' is a fluorinated $C_1$–$C_{20}$ alkyl group; $R_6$ and $R_7$ are, independently, a $C_1$–$C_{20}$ alkoxy group or a fluorinated $C_1$–$C_{20}$ alkyl group; and $R_8$ is a $C_1$–$C_{20}$ alkyl group, $R_9SH$ (3)

where $R_9$ is a $C_1$–$C_{20}$ alkyl group, a $C_1$–$C_{20}$ alkyl group with a hydroxy group, a $C_1$–$C_{20}$ hydroxyalkyl group with a hydroxy substituent, or $-(CH_2)_kCOOH$, where k is an integer from 1 to 10, and

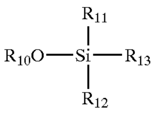
(4)

where $R_{10}$ is a $C_1$–$C_{20}$ alkyl group; $R_{11}$ and $R_{12}$ are, independently, a $C_1$–$C_{20}$ alkyl group, a $C_1$–$C_{20}$ alkoxy group, or a $C_1$–$C_{20}$ alkyl group with a mercapto group; and $R_{13}$ is a $C_1$–$C_{20}$ alkyl group with a mercapto (—SH) group, wherein the fluoroalkylsilane of said formula (2) is at least one selected from the group consisting of heptadecafluorodecyltriethoxysilane, pentadecafluorohexyltrimethoxysilane, heptadecafluorodecyltrimethoxysilane, heptadecafluorodecyltriisopropoxysilane, heptadecafluorodecyltributoxysilane, di-(heptadecafluorodecyl)diethoxysilane, and tris-(heptadecafluorodecyl)ethoxysilane, and the fluoroalkylsilane of said formula (2) is contained in an amount of 1–15 parts by weight based on 100 ports by weight of the metal compound of formula (1).

5. A transparent conductive layer comprising a conductive layer containing a metal oxide and a protective layer formed on the conductive layer, the protective layer containing a hydrolyzed and polycondensated product of a metal compound of formula (1) below and at least one of a mercapto compound of formula (3) or (4) below and its hydrolyzed and polycondensated product:

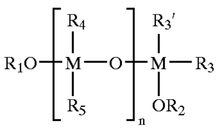
(1)

where M is selected from the group consisting of Si, Ti, Sn, and Zr;

- $R_1$ is a $C_1$–$C_{20}$ alkyl group or -$M(R_{14}R_{15}R_{16})$ where $R_{14}$, $R_{15}$, and $R_{16}$ are, independently, a $C_1$–$C_{20}$ alkyl group, a $C_1$–$C_{20}$ alkoxy group, or a $C_6$–$C_{20}$ aryl group;
- $R_2$ is a $C_1$–$C_{20}$ alkyl group;
- at least one of $R_3$ and $R_3$' is a $C_1$–$C_{20}$ alkoxy group, and the remaining group is a $C_1$–$C_{20}$ alkyl group, a $C_1$–$C_{20}$ alkoxy group, a $C_2$–$C_{20}$ alkylene group, or a $C_6$–$C_{20}$ aryl group;

at least one of $R_4$ and $R_5$ is a $C_1$–$C_{20}$ alkoxy group, and the remaining group is a $C_1$–$C_{20}$ alkyl group, a $C_2$–$C_{20}$ alkylene group, or a $C_6$–$C_{20}$ aryl group; and n is an integer from 0 to 20, $R_9SH$ (3)

where $R_9$ is a $C_1$–$C_{20}$ alkyl group, a $C_1$–$C_{20}$ alkyl group with a hydroxy group, a $C_1$–$C_{20}$ hydroxyalkyl group with a hydroxy substituent, or $-(CH_2)_k COOH$, where k is an integer from 1 to 10, and (4)

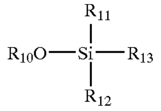

where $R_{10}$ is a $C_1$–$C_{20}$ alkyl group; $R_{11}$ and $R_{12}$ are, independently, a $C_1$–$C_{20}$ alkyl group, a $C_1$–$C_{20}$ alkoxy group, or a $C_1$–$C_{20}$ alkyl group with a mercapto group; and $R_{13}$ is a $C_1$–$C_{20}$ alkyl group with a mercapto (—SH) group, the transparent conductive layer further comprising, on the protective layer, a non-continuous coating layer containing a hydrolyzed and polycondensated product of the metal compound of said formula (1), at least one of fluoroalkylsilane of formula (2) below and its hydrolyzed and polycondensated product, and at least one of a mercapto compound of said formula (3) or (4) and its hydrolyzed and polycondensated product:

(2)

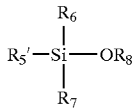

where $R_5'$ is a fluorinated $C_1$–$C_{20}$ alkyl group; $R_6$ and $R_7$ are, independently, a $C_1$–$C_{20}$ alkoxy group or a fluorinated $C_1$–$C_{20}$ alkyl group; and $R_8$ is a $C_1$–$C_{20}$ alkyl group.

6. A transparent conductive layer comprising a conductive layer containing a metal oxide and a protective layer and a non-continuous coating layer sequentially formed to protect the conductive layer, the non-continuous coating layer containing a hydrolyzed and polycondensated product of a metal compound of formula (1) below, at least one of fluoroalkylsilane of formula (2) below and its hydrolyzed and polycondensated product, and at least one of a mercapto compound of formula (3) or (4) below and its hydrolyzed and polycondensated product, and the protective layer containing a hydrolyzed and polycondensated product of the metal compound of said formula (1):

(1)

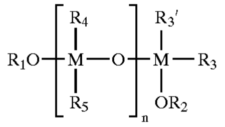

where M is selected from the group consisting of Si, Ti, Sn, and Zr;

$R_1$ is a $C_1$–$C_{20}$ alkyl group or $-M(R_{14}R_{15}R_{16})$ where $R_{14}$, $R_{15}$, and $R_{16}$ are, independently, a $C_1$–$C_{20}$ alkyl group, a $C_1$–$C_{20}$ alkoxy group, or a $C_6$–$C_{20}$ aryl group;

$R_2$ is a $C_1$–$C_{20}$ alkyl group;

at least one of $R_3$ and $R_3'$ is a $C_1$–$C_{20}$ alkoxy group, and the remaining group is a $C_1$–$C_{20}$ alkyl group, a $C_1$–$C_{20}$ alkoxy group, a $C_2$–$C_{20}$ alkylene group, or a $C_6$–$C_{20}$ aryl group;

at least one of $R_4$ and $R_5$ is a $C_1$–$C_{20}$ alkoxy group, and the remaining group is a $C_1$–$C_{20}$ alkyl group, a $C_2$–$C_{20}$ alkylene group, or a $C_6$–$C_{20}$ aryl group; and n is an integer from 0 to 20, (2)

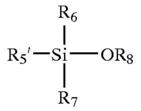

where $R_5'$ is a fluorinated $C_1$–$C_{20}$ alkyl group; $R_6$ and $R_7$ are, independently, a $C_1$–$C_{20}$ alkoxy group or a fluorinated $C_1$–$C_{20}$ alkyl group; and $R_8$ is a $C_1$–$C_{20}$ alkyl group, $R_9SH$ (3)

where $R_9$ is a $C_1$–$C_{20}$ alkyl group, a $C_1$–$C_{20}$ alkyl group with a hydroxy group, a $C_1$–$C_{20}$ hydroxyalkyl group with a hydroxy substituent, or $-(CH_2)_k COOH$, where k is an integer from 1 to 10, and (4)

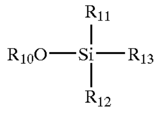

where $R_{10}$ is a $C_1$–$C_{20}$ alkyl group; $R_{11}$ and $R_{12}$ are, independently, a $C_1$–$C_{20}$ alkyl group, a $C_1$–$C_{20}$ alkoxy group, or a $C_1$–$C_{20}$ alkyl group with a mercapto group; and $R_{13}$ is a $C_1$–$C_{20}$ alkyl group with a mercapto (—SH) group.

7. A transparent conductive layer comprising a conductive layer containing a metal oxide and a protective layer and non-continuous coating layer sequentially, formed to protect the conductive layer, the non-continuous coating layer containing a hydrolyzed and polycondensated product of a metal compound of formula (1) below, at least one of fluoroalkylsilane of formula (2) below and its hydrolyzed and polycondensated product, and at least one of a mercapto compound of formula (3) or (4) below and its hydrolyzed and polycondensated product, and the protective layer containing a hydrolyzed and polycondensated product of the metal compound of said formula (1):

(1)

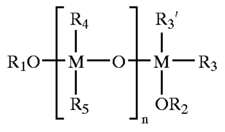

where M is selected from the group consisting of Si, Ti, Sn, and Zr;

$R_1$ is a $C_1$–$C_{20}$ alkyl group or $-M(R_{14}R_{15}R_{16})$ where $R_{14}$, $R_{15}$, and $R_{16}$ are, independently, a $C_1$–$C_{20}$ alkyl group, a $C_2$–$C_{20}$ alkoxy group, or a $C_6$–$C_{20}$ aryl group;

$R_2$ is a $C_1$–$C_{20}$ alkyl group;

at least one of $R_3$ and $R_3'$ is a $C_1$–$C_{20}$ alkoxy group, and the remaining group is a $C_1$–$C_{20}$ alkyl group, a $C_1$–$C_{20}$ alkoxy group, a $C_2$–$C_{20}$ alkylene group, or a $C_6$–$C_{20}$ aryl group;

at least one of $R_4$ and $R_5$ is a $C_1$–$C_{20}$ alkoxy group, and the remaining group is a $C_1$–$C_{20}$ alkyl group, a $C_2$–$C_{20}$ alkylene group, or a $C_6$–$C_{20}$ aryl group; and n is an integer from 0 to 20, (2)

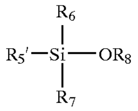

where $R_5'$ is a fluorinated $C_1$–$C_{20}$ alkyl group; $R_6$ and $R_7$ are, independently, a $C_1$–$C_{20}$ alkoxy group or a fluorinated $C_1$–$C_{20}$ alkyl group; and $R_8$ is a $C_1$–$C_{20}$ alkyl group, $$R_9SH \quad (3)$$

where $R_9$ is a $C_1$–$C_{20}$ alkyl group, a $C_1$–$C_{20}$ alkyl group with a hydroxy group, a $C_1$–$C_{20}$ hydroxyalkyl group with a hydroxy substituent, or $-(CH_2)_kCOOH$, where k is an integer from 1 to 10, and (4)

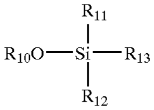

where $R_{10}$ is a $C_1$–$C_{20}$ alkyl group; $R_{11}$ and $R_{12}$ are, independently, a $C_1$–$C_{20}$ alkyl group, a $C_1$–$C_{20}$ alkoxy group, or a $C_1$–$C_{20}$ alkyl group with a mercapto group; and $R_{13}$ is a $C_1$–$C_{20}$ alkyl group with a mercapto (—SH) group, wherein the mercapto compound of said formula (3) or (4) is at least one selected from the group consisting of 3-mercaptopropyltrimethoxysilane, 3-mercaptopropylmethyldimethoxysilane, 3-mercapto-1,2-propanediol, 1-mercapto-2-propanol, 3-mercaptopropionic acid, di-(3-mercaptopropyl)dimethoxysilane, and tris-(3-mercaptopropyl)methoxysilane, and the mercapto compound is contained in an amount of 1–15 parts by weight based on 100 parts by weight of the metal compound of said formula (1).

* * * * *